United States Patent
Kim

(10) Patent No.: US 8,218,946 B2
(45) Date of Patent: Jul. 10, 2012

(54) METHOD OF STORING DATA IN MOBILE TERMINAL HAVING DIGITAL MULTIMEDIA BROADCASTING FUNCTION

(75) Inventor: Tae Young Kim, Hwaseong-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 809 days.

(21) Appl. No.: 12/357,025

(22) Filed: Jan. 21, 2009

(65) Prior Publication Data

US 2009/0185794 A1 Jul. 23, 2009

(30) Foreign Application Priority Data

Jan. 22, 2008 (KR) ........................ 10-2008-0006590

(51) Int. Cl.
H04N 5/76 (2006.01)
(52) U.S. Cl. ........................................ 386/291; 386/297
(58) Field of Classification Search .................. 386/291, 386/296, 297, 299, 292
See application file for complete search history.

(56) References Cited

U.S. PATENT DOCUMENTS

| 5,541,738 | A  | * | 7/1996 | Mankovitz | 386/245 |
| 6,567,660 | B1 | * | 5/2003 | Wegener | 455/418 |
| 2007/0067799 | A1 | * | 3/2007 | Park et al. | 725/40 |

FOREIGN PATENT DOCUMENTS

KR 10-2004-0008556 A 1/2004

* cited by examiner

*Primary Examiner* — Robert Chevalier
(74) *Attorney, Agent, or Firm* — Jefferson IP Law, LLP

(57) ABSTRACT

A mobile terminal and a method for storing data in the mobile terminal including a Digital Multimedia Broadcasting (DMB) function are provided. The method for storing data includes setting reservation information, when a reservation storage function is selected in a DMB mode, determining a program start time point and a channel according to the set reservation information through Electronic Program Guide (EPG) information and converting the DMB mode to a sleep mode, activating the DMB mode and identifying Event Information Table (EIT) information of currently received first data and a second data to be received, if a current time point is equal to the program start time point, storing the first data, if the EIT information of the first data is included in the reservation information, otherwise, determining whether the EIT information of the second data is included in the reservation information, and receiving and storing the second data.

20 Claims, 5 Drawing Sheets

METHOD OF STORING DATA IN MOBILE TERMINAL HAVING DIGITAL MULTIMEDIA BROADCASTING FUNCTION

PRIORITY

This application claims the benefit under 35 U.S.C. §119 (a) of a Korean patent application filed on Jan. 22, 2008 in the Korean Intellectual Property Office and assigned Serial No. 10-2008-0006590, the entire disclosure of which is hereby incorporated by reference.

BACKGROUND OF THE INVENTION

1. Field of the Invention

The present invention relates to a method of storing data in a mobile terminal. More particularly, the present invention relates to a mobile terminal and a method for storing data by controlling an active state of a Digital Multimedia Broadcasting (DMB) mode in the mobile terminal.

2. Description of the Related Art

As mobile terminals become widely used, user demand increases for mobile terminals having various functions as well as a communication function. The various functions in the mobile terminal may include a DMB function, a Moving Picture Experts Group-1 Audio Layer 3 (MP3) function, a camera function and the like.

The DMB function is provided in mobile terminals and performs a television function. The DMB function has an advantage in that a user can view a program regardless of a time and a place.

More particularly, the user can select a channel for providing only music data and verify the music data through the DMB function. When specific music data selected by the user are reproduced, the user can store the reproduced music data using a recording function. However, when the user does not use the DMB function, if the music data requested by the user are broadcast, the music data cannot be stored. Further, when the user uses a reservation storage function in the mobile terminal, data selected by the user and an entire program is stored. Thus, a large amount of storage space of the mobile terminal is consumed.

Therefore, a need exists for a mobile terminal and a method for storing requested data in the mobile terminal while consuming a small amount of storage space.

SUMMARY OF THE INVENTION

An aspect of the present invention is to address at least the above-mentioned problems and/or disadvantages and to provide at least the advantages described below. Accordingly, an aspect of the present invention is to provide a mobile terminal and method for storing data requested by a user by controlling a DMB function in the mobile terminal.

In accordance with an aspect of the present invention, a method of storing data is provided. The method includes setting reservation information, when a reservation storage function is selected in a Digital Multimedia Broadcasting (DMB) mode, determining a program start time point and a channel according to the set reservation information through Electronic Program Guide (EPG) information and converting the DMB mode to a sleep mode, activating the DMB mode and identifying Event Information Table (EIT) information of a currently received first data and a next second data to be received, if a current time point is equal to the program start time point, storing the first data, if the EIT information of the first data is included in the reservation information, determining whether the EIT information of the second data is included in the reservation information, if the EIT information of the first data is not included in the reservation information, and receiving the second data and storing the second data, if the EIT information of the second data is included in the reservation information.

In accordance with another aspect of the present invention, a mobile terminal is provided. The mobile terminal includes a broadcasting reception unit for receiving a digital broadcasting signal transmitted from a broadcasting station, an input unit for selecting a Digital Multimedia Broadcasting (DMB) mode, a controller for receiving the digital broadcasting signal from the broadcasting reception unit, for setting reservation information, when a reservation storage function is selected in the DMB mode, for determining a program start time point and a channel according to the set reservation information through Electronic Program Guide (EPG) information, for tuning to the determined channel and converting the DMB mode to a sleep mode, for activating the DMB mode and indentifying Event Information Table (EIT) information of a currently received first data and a next second data to be received, if a current time point is equal to the program start time point, a storage unit for storing the first data, if the EIT information of the first data is included in the reservation information, and a display unit for displaying the determined channel and program start time point.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
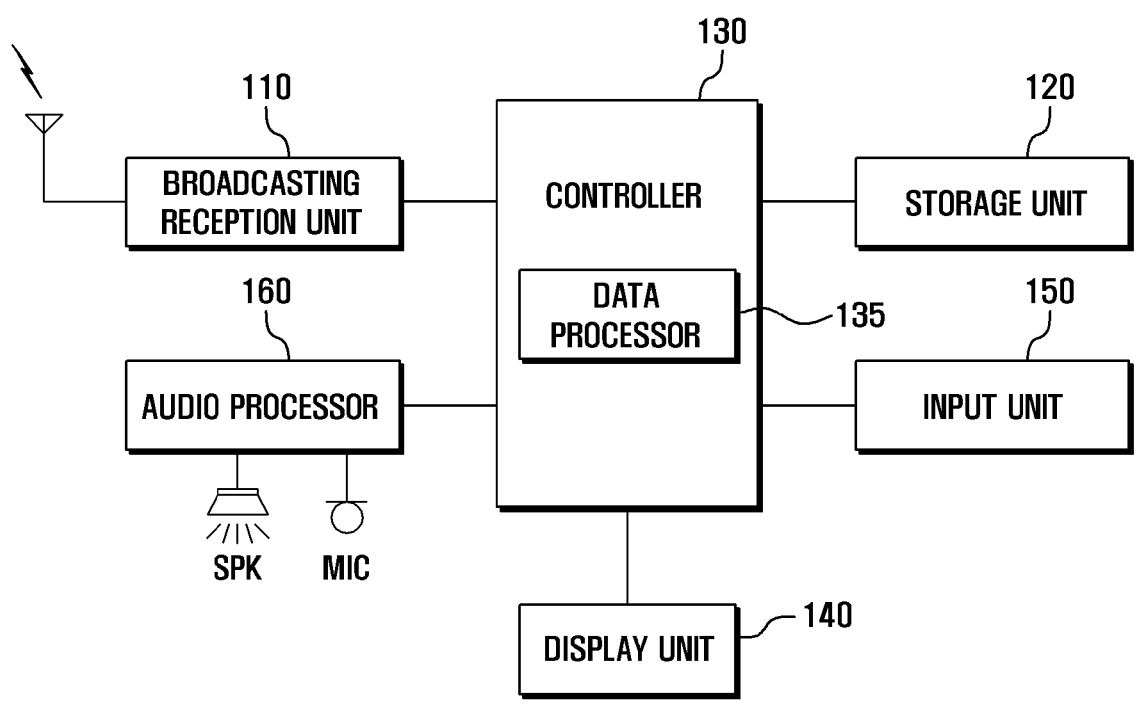
FIG. 1 is a block diagram illustrating a configuration of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, Electronic Program Guide (EPG) information is digital broadcasting program information. The EPG information includes detailed information on a broadcasting schedule, including broadcasting programs, broadcasting times as a start time point of a program and an end time point of program thereof and corresponding broadcasting channels. Further, the EPG information may include Event Information Table (EIT) information for a specific program, which is detailed information regarding data reproduced at the program and includes a reception time point of specific data information, a start time point of reproduction of specific data information and an end time point of reproduction of specific data information. With respect to music data, the EIT information includes information, such as a singer, a title, a genre, a composer, a lyric writer, a performing musician, lyrics and a total duration (reproduction time period) of the music data.

The data includes all data received through a broadcasting reception unit, and may include image data, sound data and character data necessary for reproducing a program. In general, data are received in a packet format wherein the packet includes a header and a body. In this case, the header contains information related to the packet including EIT information and the body contains data. The EIT information includes information regarding data that is currently received and next data to be received through a broadcasting reception unit. In the case of music data, the EIT information includes information, such as a singer, a title, a genre, a composer, a lyric writer, a performing musician, lyrics, a start time point of data and next data, and an end time point of data and next data.

FIG. 1 is a block diagram illustrating a configuration of a mobile terminal according to an exemplary embodiment of the present invention.

Referring to FIG. 1, the mobile terminal includes a broadcasting reception unit 110, a storage unit 120, a controller 130, a display unit 140, an input unit 150 and an audio processor 160.

The broadcasting reception unit 110 receives a digital broadcasting signal transmitted from a broadcasting station through an antenna and transmits the received digital broadcasting signal to the controller 130.

The storage unit 120 stores various programs for controlling general operations of the mobile terminal and various data generated while operating the mobile terminal. More particularly, the storage unit 120 stores reservation information for classifying data for storage from broadcasting data received by control of the controller 130. Further, the storage unit 120 stores the data classified according to the stored reservation information by the control of the controller 130.

The controller 130 controls general operations of the mobile terminal and controls a state of units constituting the mobile terminal. The controller 130 further includes a data processor 135 for demodulating a digital broadcasting signal received through the broadcasting reception unit 110 to broadcasting data. The controller 130 classifies digital broadcasting program information (hereinafter, EPG information) in the demodulated broadcasting data. The controller 130 stores EPG information that includes detailed data information in the storage unit 120.

The controller 130 controls the storage unit 120 to store the reservation information selected for classifying data for storage. The controller 130 determines the detailed data information (hereinafter, EIT information) included in the stored EPG information. The controller 130 determines whether the determined EIT information is included in the reservation information. If the determined EIT information is included in the reservation information, the controller 130 determines a start time of a program using the stored EPG information including the determined EIT information.

The controller 130 activates a Digital Multimedia Broadcasting (DMB) function according to the determined start time of the program. The controller 130 determines if EIT information is included in a packet received from the broadcasting reception unit 110. The EIT information in the received packet includes information regarding currently received data and next data to be received. Using the EIT information, the controller 130 activates the DMB function and determines whether the received data is stored. While the data are being stored, the controller 130 controls the display unit 140 to display a notification that the data are being stored and to reproduce the data.

The display unit 140 displays various information related to the state and operation of the mobile terminal. The display unit 140 displays an active state of the DMB function by the control of the controller 130. Further, the display unit 140 may reproduce data while being stored in the storage unit 120 by the control of the controller 130. The display unit 140 may display that the data is being stored.

The input unit 150 receives user input signals related to numeral and character information, setting of various functions, a function control of the mobile terminal and the like, and outputs the input signals to the controller 130. The input unit 150 may be formed with a touch screen or with a conventional key input unit 150.

The audio processor 160 includes a microphone (MIC) and a speaker (SPK). The audio processor 160 modulates a sound signal input through the microphone (MIC) to sound data and transmits the modulated sound data to the controller 130. The audio processor 160 also demodulates sound data received from the controller 130 to a sound signal and outputs the demodulated sound signal through the speaker (SPK).

In the mobile terminal, when a data reservation storage function is selected through the input unit 150, the controller 130 converts a DMB mode to a sleep mode. When the DMB mode is converted to the sleep mode, the controller 130 uses EPG information included in broadcasting data to determine a start time point and an end time point of a program including desired data. When a current time point reaches a start time point of the program including the desired data, the controller 130 activates the DMB mode to replace the sleep mode, and stores the received data. The reception start time point of data requested by the user is determined by the controller 130 through EIT information included in a packet header that is received through the broadcasting reception unit 110. If a current time point is not a reception time point of the data requested by the user, the controller 130 remains in the sleep mode. Accordingly, the controller 130 sustains the DMB mode in the sleep mode until a reception start time point of the data requested by the user.

Figure 2:
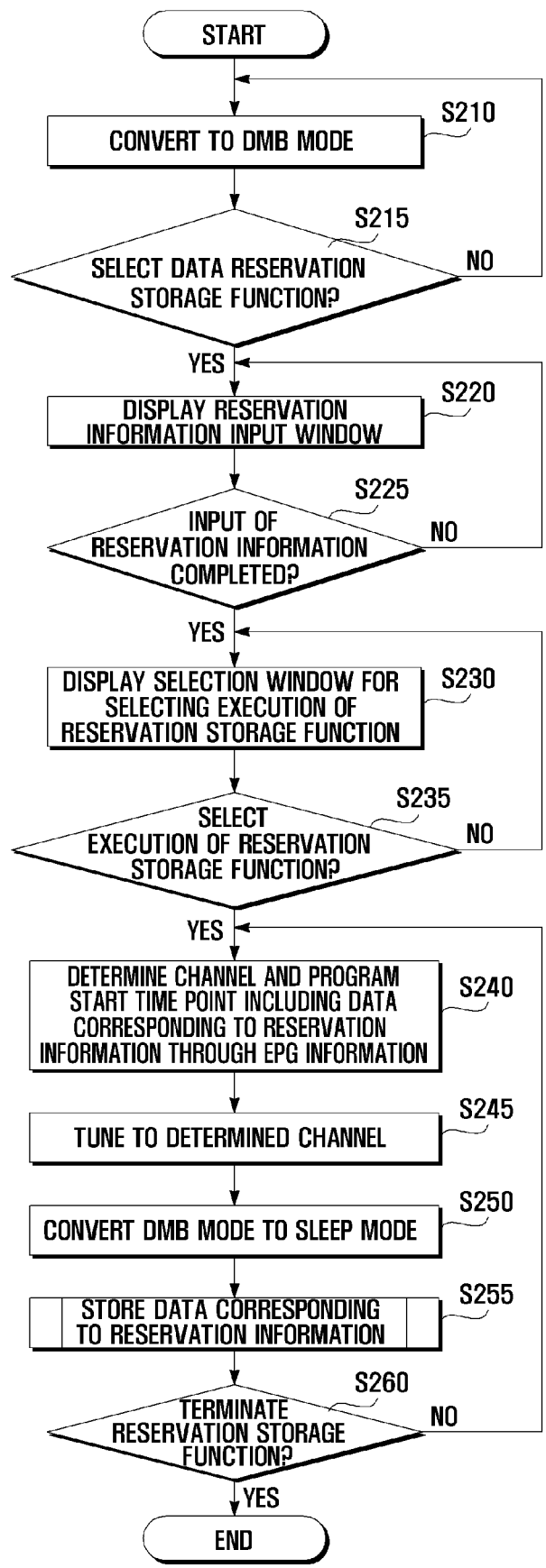
FIG. 2 is a flowchart illustrating a method of storing reservation data according to an exemplary embodiment of the present invention.

FIG. 2 is a flowchart illustrating a method of storing reservation data according to an exemplary embodiment of the present invention.

Referring to FIG. 2, when a DMB mode is selected through the input unit 150, the controller 130 converts a mode of the mobile terminal to the DMB mode in step S210. The controller 130 controls the display unit 140 to display an initial screen of the DMB mode.

The controller 130 determines whether a data reservation storage function is selected by the user in step S215. If a data reservation storage function is selected through a menu or through function keys provided in the input unit 150, the controller 130 controls the display unit 140 to display a reservation information input window for inputting reservation information necessary for storing data in step S220. The reservation information input window may be displayed as shown FIG. 3.

Figure 3:
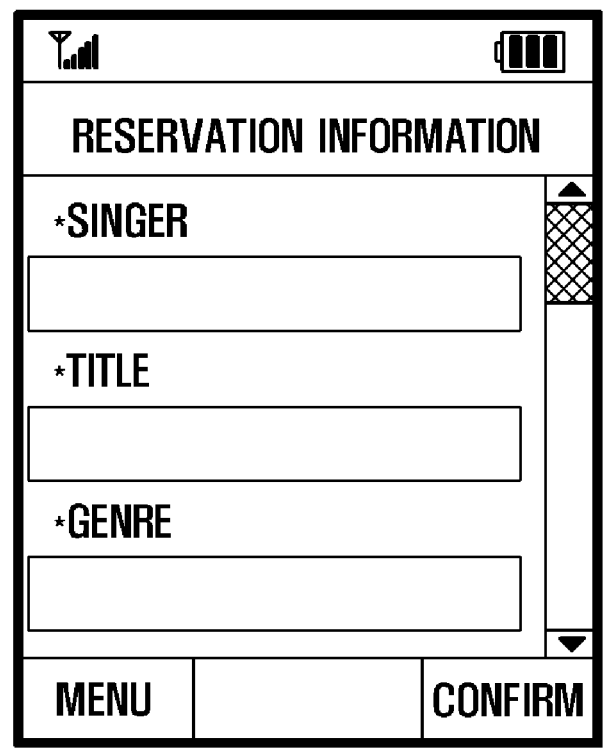
FIG. 3 illustrates an example of a screen for inputting reservation information according to an exemplary embodiment of the present invention.

FIG. 3 illustrates an example of a screen for inputting reservation information according to an exemplary embodiment of the present invention.

Referring to FIG. 3, the reservation information input window is classified to input a reservation word based on an item. For example, if data to be stored is music data, the controller 130 controls the display unit 140 to display the reservation information input window in order to input reservation information based on a singer, a title and a genre, as shown in FIG. 3.

The controller 130 determines whether the input of reservation information is completed in step S225. Completion of input of reservation information to the reservation information input window is confirmed by pressing a confirm key.

If the input of reservation information is completed, the controller 130 controls the display unit 140 to display a selection window for selecting execution of a reservation storage function in step S230.

The controller 130 determines whether execution of a reservation storage function is selected in step S235. If execution of the reservation storage function is selected through the input unit 150, the controller 130 stores the reservation information input to the reservation information input window in the storage unit 120. Here, an execution period of a reservation storage function may also be set.

The controller 130 determines a channel and a program start time point including data corresponding to reservation information through the received EPG information in step S240. The controller 130 controls the display unit 140 to display the determined channel and program start time point. Here, a plurality of channels and programs including the data requested by the user may exist. In this case, the controller 130 selects a channel having a program broadcasting start time point closest to the current time point.

The controller 130 tunes to the determined channel in step S245 and converts the DMB mode to a sleep mode in step S250.

The controller 130 stores the received broadcasting data corresponding to the reservation information in step S255.

The storing of the received broadcasting data corresponding to the reservation information in step 255 is described in detail with reference to FIGS. 4 to 6.

Figure 4:
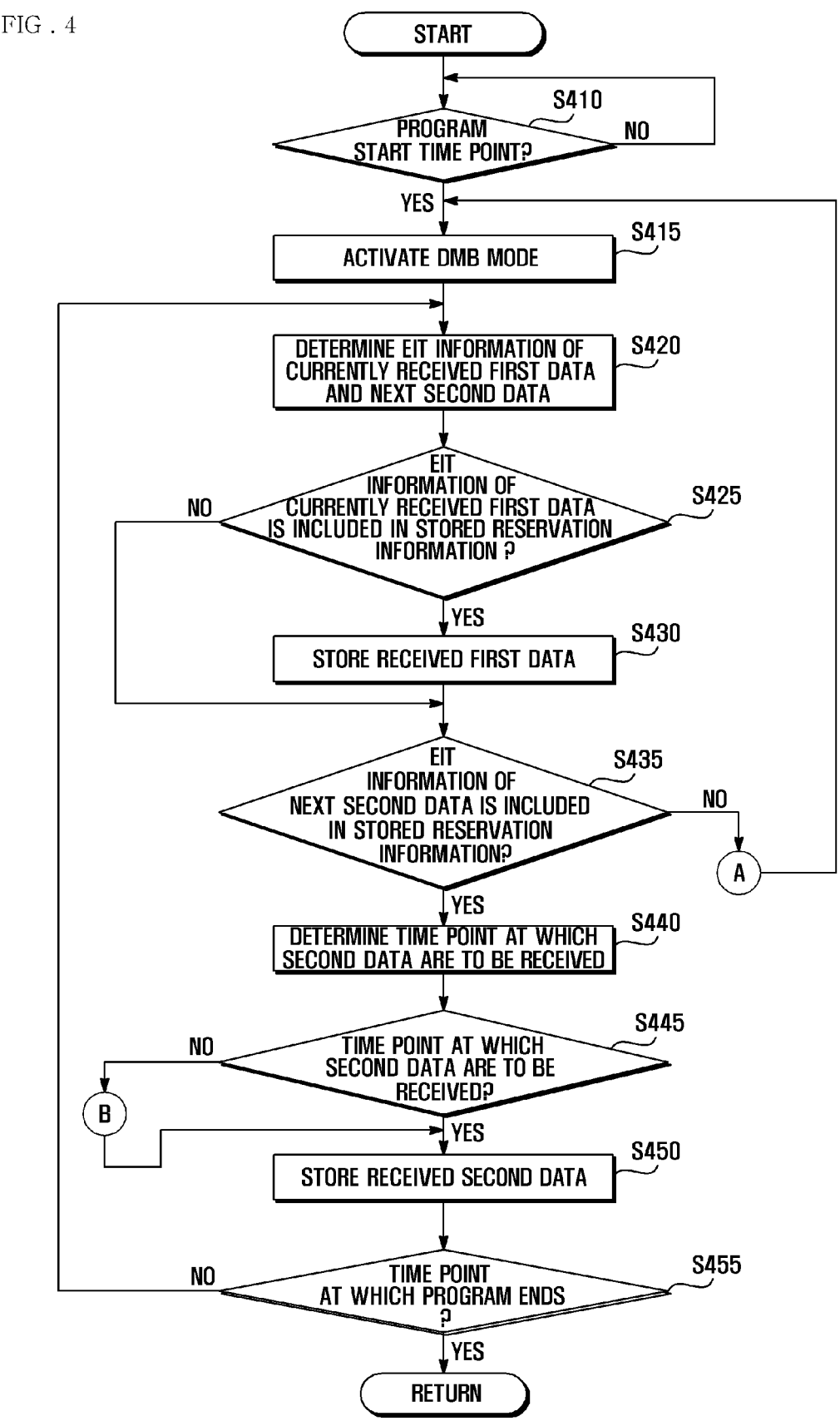
FIG. 4 is a flowchart illustrating a process of storing data of reservation information according to an exemplary embodiment of the present invention.

FIG. 4 is a flowchart illustrating a process of storing received broadcasting data corresponding to reservation information according to an exemplary embodiment of the present invention.

Referring to FIG. 4, when performing the sleep mode in step S250 of FIG. 2, the controller 130 determines whether a current time point is equal to a start time point of a program including data requested by the user in step S410. The program start time point is previously determined through the EPG information and stored in the storage unit 120 by the controller 130.

When a current time point is equal to a determined program start time point, the controller 130 activates the DMB mode from the sleep mode in step S415.

The controller 130 identifies EIT information in a currently received first data through the broadcasting reception unit 110 in step S420. The EIT information may include detailed information of the currently received first data and a next second data to be received. For example, if the received data are music data, the EIT information of the first data and the second data may include information regarding a singer, a genre and a time duration of a song. More particularly, the EIT information may include information corresponding to a reception start time point of music data, an end reception time point of music data and a time point at which next music data are to be received.

The controller 130 determines whether the EIT information of the currently received first data is included in the stored reservation information in step S425. For example, if a ballade is included in the EIT information of the currently received first data, the controller 130 determines whether the user stored a ballade as a genre in the reservation information.

If the EIT information of the currently received first data is not included in the stored reservation information, the controller 130 determines whether the EIT information of the next second data is included in the stored reservation information in step S435.

If the EIT information of the currently received first data is included in the stored reservation information, the controller 130 stores the currently received first data in the storage unit 120 in step S430.

The controller 130 determines whether the EIT information of the next second data is included in the stored reservation information in step S435.

Details regarding the EIT information of the second data that is not included in the stored reservation information is described with reference to FIG. 5.

Figure 5:
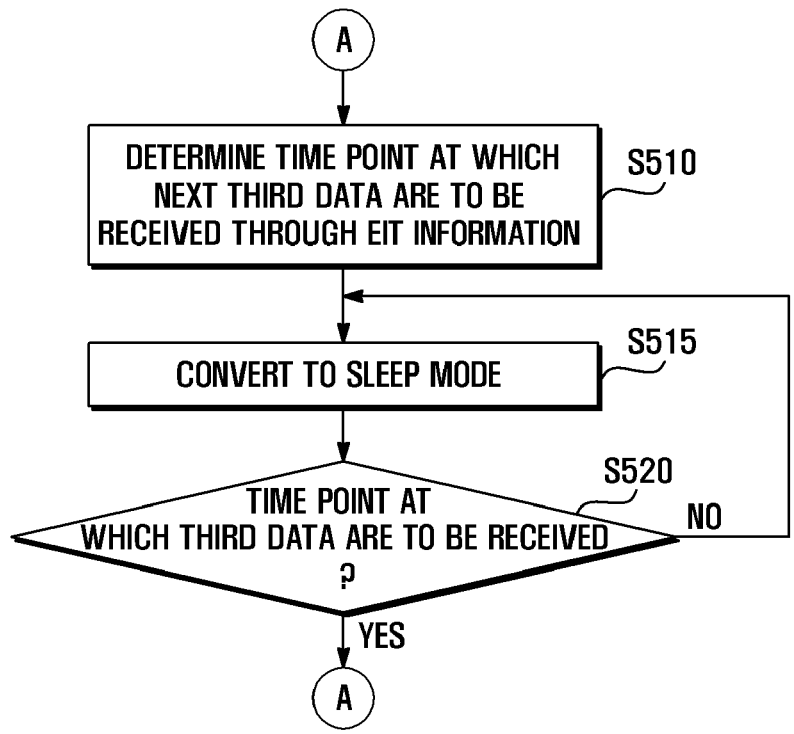
FIG. 5 is a flowchart illustrating operations of controlling a sleep mode when data not included in reservation information is received according to an exemplary embodiment of the present invention.

FIG. 5 is a flowchart illustrating operations of controlling a sleep mode when EIT information of received data is not included in the stored reservation information according to an exemplary embodiment of the present invention.

Referring to FIG. 5, if the EIT information of the next second data is not included in the stored reservation information in step S435, the controller 130 determines a reception time point of next third data through the end time point of the second data included in the EIT information in step S510.

The controller 130 then converts the DMB mode to the sleep mode in step S515.

The controller 130 determines whether a current time point is equal to a time point at which the third data are to be received in step S520. When a current time point is equal to a time point at which the third data are to be received, the process returns to step S415 in FIG. 4 and the controller 130 activates the DMB mode.

Referring to FIG. 4, if the EIT information of the next second data is included in the stored reservation information in step S435, the controller 130 determines a time point at which the second data are to be received in step S440. The controller 130 also determines whether a current time point is equal to a time point at which the second data are to be received in step S445.

When a current time point is equal to a time point at which the second data are to be received, the controller 130 controls the storage unit 120 to store the received second data in step S450.

Details of a current time point that is not equal to a time point at which the second data are to be received is described with reference to FIG. 6.

Figure 6:
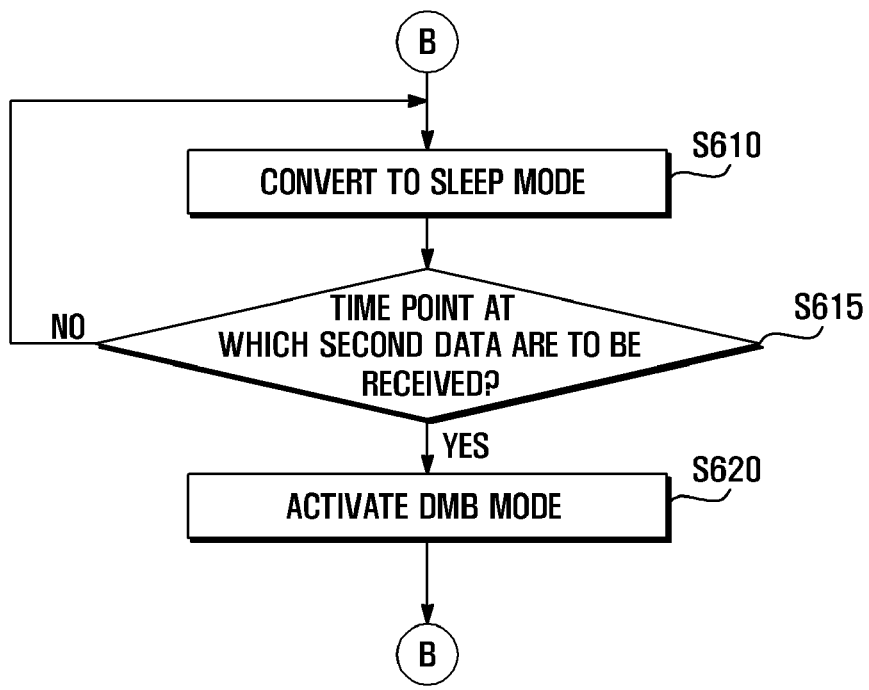
FIG. 6 is a flowchart illustrating operations of storing data according to a reception time point of data included in reservation information according to an exemplary embodiment of the present invention.

FIG. 6 is a flowchart illustrating operations of storing received data according to a reception time point of data included in reservation information according to an exemplary embodiment of the present invention.

Referring to FIG. 6, if a current time point is not equal to a time point at which the second data are to be received in step S445, the controller 130 converts the DMB mode to the sleep mode in step S610.

The controller 130 determines whether a current time point is a time point at which the second data are to be received in step S615.

If a current time point is a time point at which the second data are to be received, the controller 130 activates the DMB mode in step S620. The process then returns to step S450 in FIG. 4, and the controller 130 controls the storage unit 120 to store the received data.

The controller 130 determines whether a current time point is equal to a time point at which the program ends in step S455.

If a current time point is not equal to a time point at which the program ends, the process returns to step S420.

If a current time point is equal to a time point at which the program ends, the process returns to step S260 in FIG. 2.

Returning to FIG. 2, the controller 130 determines whether the reservation storage function is terminated in step S260.

If the reservation storage function is terminated by the user or if the set reservation storage period is completed, the controller 130 determines that the reservation storage function is terminated.

If the reservation storage function is not terminated, the process returns to step S240 and the controller 130 determines a next channel and a program start time point including data corresponding to the stored reservation information. Accordingly, when a plurality of channels and programs including the reservation information exist, the controller 130 may store requested data.

As described above, according to exemplary embodiments the present invention, when the mobile terminal is in a sleep mode, if requested data is received, the mobile terminal may revert to a DMB mode and store only the requested received data.

Further, the mobile terminal may reduce battery consumption by controlling an active state of a DMB function using EIT information included in EPG information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for storing data, the method comprising:
setting reservation information entered by a user, when a reservation storage function is selected in a Digital Multimedia Broadcasting (DMB) mode;
determining a program start time point and a channel according to the set reservation information through Electronic Program Guide (EPG) information;
tuning to the determined channel and converting the DMB mode to a sleep mode;
activating the DMB mode and identifying Event Information Table (EIT) information of a currently received first data and a second data to be received from a broadcast, if a current time point is equal to the program start time point;
storing the first data, if the EIT information of the first data is included in the reservation information;
determining whether the EIT information of the second data is included in the reservation information, if the EIT information of the first data is not included in the reservation information; and
receiving the second data and storing the second data, if the EIT information of the second data is included in the reservation information.

2. The method of claim 1, wherein the receiving and the storing of the second data comprises receiving the second data and storing the second data, if a current time point is equal to a time point at which the second data are to be received.

3. The method of claim 2, further comprising:
converting the DMB mode to the sleep mode, if a current time point is not equal to a program start time point; and
activating the DMB mode, and receiving and storing the second data, if a current time point is equal to a time point at which the second data are to be received.

4. The method of claim 1, further comprising:
determining a time period at which third data is to be received next from the EIT information, if the EIT information of the second data is not included in the reservation information; and
converting the DMB mode to the sleep mode.

5. The method of claim 4, further comprising activating the DMB function, if a current time point is equal to a time point at which third data are to be received.

6. The method of claim 1, wherein the reservation information comprises at least one of a singer, a title and a genre.

7. The method of claim 1, wherein the EIT information comprises at least one of a singer, a title, a genre, a time duration of corresponding data and a time point at which next data are to be received.

8. The method of claim 7, wherein the EIT information comprises a reception start time point of music data, an end reception time point of music data and a time point at which next music data are to be received.

9. The method of claim 1, further comprising determining whether a current time point is equal to a time point at which the program ends.

10. The method of claim 9, further comprising determining whether the reservation storage function is terminated, if a current time point is equal to a time point at which the program ends.

11. The method of claim 10, further comprising determining a next channel and a program start time point comprising data corresponding to the stored reservation information, if the reservation storage function is not terminated.

12. A mobile terminal comprising:
a broadcasting reception unit for receiving a digital broadcasting signal transmitted from a broadcasting station;
an input unit for selecting a Digital Multimedia Broadcasting (DMB) mode;
a controller for receiving the digital broadcasting signal from the broadcasting reception unit, for setting reservation information entered by a user, when a reservation storage function is selected in the DMB mode, for determining a program start time point and a channel according to the set reservation information through Electronic Program Guide (EPG) information, for tuning to the determined channel and converting the DMB mode to a sleep mode, for activating the DMB mode and indentifying Event Information Table (EIT) information of a currently received first data and a second data to be received from a broadcast, if a current time point is equal to the program start time point;

a storage unit for storing the first data, if the EIT information of the first data is included in the reservation information; and a display unit for displaying the determined channel and program start time point.

13. The mobile terminal of claim 12, wherein the controller determines whether the EIT information of the second data is included in the reservation information, if the EIT information of the first data is not included in the reservation information.

14. The mobile terminal of claim 13, wherein the controller determines a time period at which third data are to be received next from the EIT information, if the EIT information of the second data is not included in the reservation information, and converts the DMB mode to the sleep mode.

15. The mobile terminal of claim 14, wherein the controller activates the DMB function, if a current time point is equal to a time point at which the third data are to be received.

16. The mobile terminal of claim 12, wherein the controller receives the second data, if the EIT information of the second data is included in the reservation information.

17. The mobile terminal of claim 16, wherein the controller receives the second data and the storage unit stores the second data, if a current time point is equal to a time point at which the second data are to be received.

18. The mobile terminal of claim 17, wherein the controller converts the DMB mode to the sleep mode, if a current time point is not equal to a program start time point, and activates the DMB mode and receives the second data, if a current time point is equal to a time point at which the second data is to be received.

19. The mobile terminal of claim 12, wherein the reservation information comprises at least one of a singer, a title and a genre.

20. The mobile terminal of claim 12, wherein the EIT information comprises at least one of a singer, a title, a genre, a time duration of corresponding data and a time point at which next data are to be received.

* * * * *